United States Patent
Mielenz et al.

(10) Patent No.: US 11,077,867 B2
(45) Date of Patent: Aug. 3, 2021

(54) METHOD FOR DETERMINING A POSE OF A VEHICLE DRIVING IN AN AT LEAST PARTIALLY AUTOMATED MANNER, USING DIFFERENT LANDMARK TYPES

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 16/088,361

(22) PCT Filed: Feb. 6, 2017

(86) PCT No.: PCT/EP2017/052485
§ 371 (c)(1),
(2) Date: Sep. 25, 2018

(87) PCT Pub. No.: WO2017/174228
PCT Pub. Date: Oct. 12, 2017

(65) Prior Publication Data
US 2020/0317222 A1    Oct. 8, 2020

(30) Foreign Application Priority Data
Apr. 8, 2016    (DE) .......................... 102016205867.3

(51) Int. Cl.
*B60W 60/00*    (2020.01)
*B60W 50/06*    (2006.01)
*G01C 21/36*    (2006.01)

(52) U.S. Cl.
CPC ........ *B60W 60/0025* (2020.02); *B60W 50/06* (2013.01); *G01C 21/3679* (2013.01);
(Continued)

(58) Field of Classification Search
CPC .............. B60W 60/0025; B60W 50/06; G01C 21/3602; G01C 21/3679; G01C 21/3691
See application file for complete search history.

(56) References Cited

U.S. PATENT DOCUMENTS 6,151,539 A  * 11/2000 Bergholz .............. G01S 17/931
                                                         701/25
2005/0288859 A1* 12/2005 Golding ............. G01C 21/3644
                                                        701/438
(Continued)

FOREIGN PATENT DOCUMENTS

DE        102014206901 A1    10/2015
JP           2015108604 A     6/2015
WO     WO-2008080606 A1 *    7/2008  ............. G01C 21/00

OTHER PUBLICATIONS

International Search Report for PCT/EP2017/052485, dated May 10, 2017.

*Primary Examiner* — Peter D Nolan
*Assistant Examiner* — Kenneth M Dunne
(74) *Attorney, Agent, or Firm* — Norton Rose Fulbright US LLP; Gerard Messina

(57) ABSTRACT

A method is described for determining a pose of a vehicle that is driving in an at least partially automated manner, with the aid of different landmark types, and in order to determine the pose of the vehicle, a vehicle control system processes landmark data of the detected landmark types with the aid of at least one detector algorithm. At least one detection algorithms is selected and used for processing the landmark data of certain landmark types as a function of environmental influences.

8 Claims, 1 Drawing Sheet

(52) U.S. Cl.
CPC ..... *G01C 21/3691* (2013.01); *B60W 2552/00* (2020.02); *B60W 2554/20* (2020.02); *B60W 2555/20* (2020.02)

(56) References Cited

U.S. PATENT DOCUMENTS

| | | | |
|---|---|---|---|
| 2008/0262717 A1* | 10/2008 | Ettinger | G01C 21/3644 701/467 |
| 2015/0233720 A1* | 8/2015 | Harada | G01C 21/30 701/409 |
| 2017/0314954 A1* | 11/2017 | Golding | G01C 21/3602 |

* cited by examiner

METHOD FOR DETERMINING A POSE OF A VEHICLE DRIVING IN AN AT LEAST PARTIALLY AUTOMATED MANNER, USING DIFFERENT LANDMARK TYPES

FIELD OF THE INVENTION

The present invention relates to a method for determining a pose of a vehicle driving in an at least partially automated manner, using different landmark types; to ascertain the pose of the vehicle, a vehicle control system processes landmark data of the detected landmark types with the aid of at least one detector algorithm.

BACKGROUND INFORMATION

In the technical field, a pose is understood as the spatial position of an object, i.e. the position and the orientation of an object in the two-dimensional space or in the three-dimensional space.

The present method for determining the pose of the vehicle is at least additionally based on landmarks of different types in the environment of the vehicle, in which GPS data, for example, are able to represent a pose basis. Pose data of the vehicle based on GPS data are able to be supplemented with data that are generated from the detection of landmarks. In particular the orientation, e.g., the driving direction of the vehicle, is largely able to be determined with the aid of landmarks. The accuracy of the determination of the pose of the vehicle based on landmarks is greater than the accuracy of the determination using GPS data. In the case of vehicles driving in a partially automated manner, and in particular in the case of vehicles that will be driving fully automatically in the future, the pure GPS navigation is no longer sufficient for guiding the vehicle, and systems have to be used that detect the immediate environment of the vehicle and perform the control of the vehicle especially while detecting landmarks. The term 'vehicle control system' essentially encompasses all of the components that are necessary for detecting the pose, for evaluating the data, and for controlling the vehicle. The vehicle control system in particular includes detectors such as laser, radar, infrared sensors, capacitive sensors, LIDAR sensors and/or a video-image acquisition.

In this context, the document DE 10 2014 206 901 A1, for example, describes a method for determining the pose of a vehicle that is driving in an at least partially automated manner in an environment. The situation detection, for one, is based on an environment detection using an environment-sensor system, which includes ultrasonic, laser, radar, infra-red and capacitive sensors, LIDAR sensors and/or a video-image acquisition. The situation detection while the vehicle is moving in traffic is to be based on the detection of objects outside the vehicle, for which purpose information signs are relevant that also point to a specific situation. These may be optical markings, objects or boundaries, for example. Additionally or alternatively, in an effort to improve the accuracy of the situation detection, further technologies may be used for a localization; for example, geo data are able to be ascertained with the aid of a GPS system or digital maps including landmarks, in combination with an odometry system. Landmarks are objects in the immediate vicinity of the vehicle, but also traffic signs such as traffic lights and the like, for example, as well as lane markings. The different types of landmarks are detected by different detectors and processed using an individually allocated detector algorithm in each case.

In other words, measured sensor data, from which objects are able to be extracted with the aid of the detector algorithms, are therefore used as the basis for perceiving the environment of the vehicle. Using these objects, the vehicle environment is able to be modeled in order to thereby plan a trajectory for the ego vehicle, for example, and to be able to make other decisions on action. The quality of the environment model heavily depends on the environment-sensor system used. Because of the way the systems operate, they differ in their measuring characteristics with regard to accuracy and range, and their capability usually exhibits a significant dependency on environmental conditions such as rain, fog, sun radiation and the like. For example, when a roadway is wet, a road marking may not reliably serve as a landmark type because a wet roadway may be reflective, especially in darkness, so that corresponding detectors are unable to be activated. In addition to weather influences, masking effects, e.g., due to other road users, as well as the time of day are counted among the aforementioned environmental influences. However, these influence factors do not affect all types of landmarks to the same degree. As a rule, signal systems, for example, are easily detectable regardless of the weather conditions, whereas in the case of optically operating detection systems, for instance, it is not always possible to reliably model a corresponding environment with physical objects in the immediate environment of the vehicle under all illumination conditions.

If all detectors are activated by the vehicle control system, and if one or more detector algorithm(s) is/are processed in the vehicle control system for each detector, then the complete exploitation of the detection of all types of landmarks requires considerable hardware resources. Due to cost reasons, in particular, the hardware resources available in a vehicle must be considered limited. All detector algorithms have to manage with the available processor capacity. The goal is to minimize the absorbed processing power of the vehicle control system in the vehicle while ensuring that the safety in the guidance of the vehicle is not adversely affected, if at all possible.

SUMMARY

It is an object of the present invention to further develop a method for determining a pose of a vehicle driving in an at least partially automated manner. The present method is to be developed in such a way that the necessary processing power and the data quantity to be processed are reduced. In the process, the vehicle driving in a partially automated manner should continue to be controllable in a safe manner.

The present invention includes the technical teaching according to which at least one detection algorithm is selected and used for processing the landmark data of certain landmark types as a function of environmental influences.

The core of the present invention is the incorporation of sensable environmental influences on the selection of landmark types for the corresponding selection of allocated detection algorithms, so that only the detection algorithms that are actually required for the control of the vehicle are processed in the vehicle control system. Landmark types that are unable to be detected or that are unable to be detected in a meaningful manner and processed using corresponding detection algorithms because of certain environmental influences are not incorporated into the control algorithm in the first place. As a result, the method according to the present invention allows for the selection of detection algorithms, i.e. specialized algorithms for the detection of a certain type of object such as traffic signs, for instance, which are denoted as landmark types in this instance. Landmark types that are detectable with an insufficient quality under existing environmental influences such as rain or a corresponding illumination, are not taken into consideration. In an advantageous manner, due to the chosen types of landmarks, the present method therefore ensures that the functional components based on perception have a sufficiently large capacity and that the processing power of the vehicle control system required for the detection is kept to a minimum at the same time. For example, the switchover between the detection algorithms may result in an advantageous effect on the required computer resources and thus in a stable behavior of the system as a whole.

The environmental influences, for example, are made up of the weather, the traffic, the visibility, the light conditions and/or wetness, and also of road markings, congestion, heavy oncoming traffic that may mask landmark types, vehicles driving in front and the like. The environmental influences are detected with the aid of environment sensors of the vehicle and transmitted to the vehicle control system.

Each kind of landmark type is allocated at least one dedicated detection algorithm, and the vehicle control system activates the detection algorithm or a number of detection algorithms that supplies or supply the greatest informational content as a function of environmental influences. For example, when a road is wet and reflective, especially in darkness, road markings are disregarded so that corresponding detectors for detecting road markings will not be activated or an allocated detection algorithm will not be activated. Under backlight conditions, for instance, it may also be provided not to consider illumination devices such as traffic-signal lights or the illumination of vehicles traveling in front since a corresponding detection is not possible in a meaningful way, especially in the presence of backlight, and a corresponding detection quality is not achievable, so that corresponding signaling systems offer only a reduced informational content when backlight is present, for instance.

For an improved execution of the present method, it may be provided that the vehicle control system is trained in an autonomous manner with landmark types to be preferred as a function of the environmental influences. For example, empirically analyzed relationships between landmark types and an achievable quality of the detection as a function of environmental influences such as weather, light conditions, illumination and the like are able to be detected, so that the vehicle control system allocates corresponding landmark types against the backdrop of a certain environment scenario and categorizes and disregards further landmark types, for example. Such training leads to a steady improvement in the method of functioning of the vehicle control system and to an increasingly resource-sparing utilization.

According to a further advantageous improvement of the present method, the selection of the detection algorithm for processing the landmark data of certain landmark types is additionally carried out as a function of localization scenarios. This makes it possible to achieve a further improvement in driving, and if the quantity of landmark data is increased or reduced as needed as a function of the localization scenarios, then this provides the advantage of a smaller data volume for determining the pose of the vehicle, which reduces the data volume for processing in the vehicle control system; in addition, a data volume to be transmitted, which is exchanged with a back-end server, for instance, is smaller.

The selection of detection algorithms by the vehicle control system may be made in such a way that a switch is possible between different detection algorithms, and it is also possible to activate or deactivate detection algorithms.

The present invention is furthermore directed to a vehicle control system for executing a method for determining the pose of a vehicle that is driving in an at least partially automated manner using different landmark types; for the determination of the pose of the vehicle, the landmark data of the detected landmark types are processed with the aid of the vehicle control system using at least one detection algorithm. In this context it is provided that at least one detection algorithm is selected and used for processing the landmark data as a function of environmental influences. Additional features and allocated advantages of the aforedescribed method are also taken into consideration for the vehicle control system.

DETAILED DESCRIPTION

Figure 1:
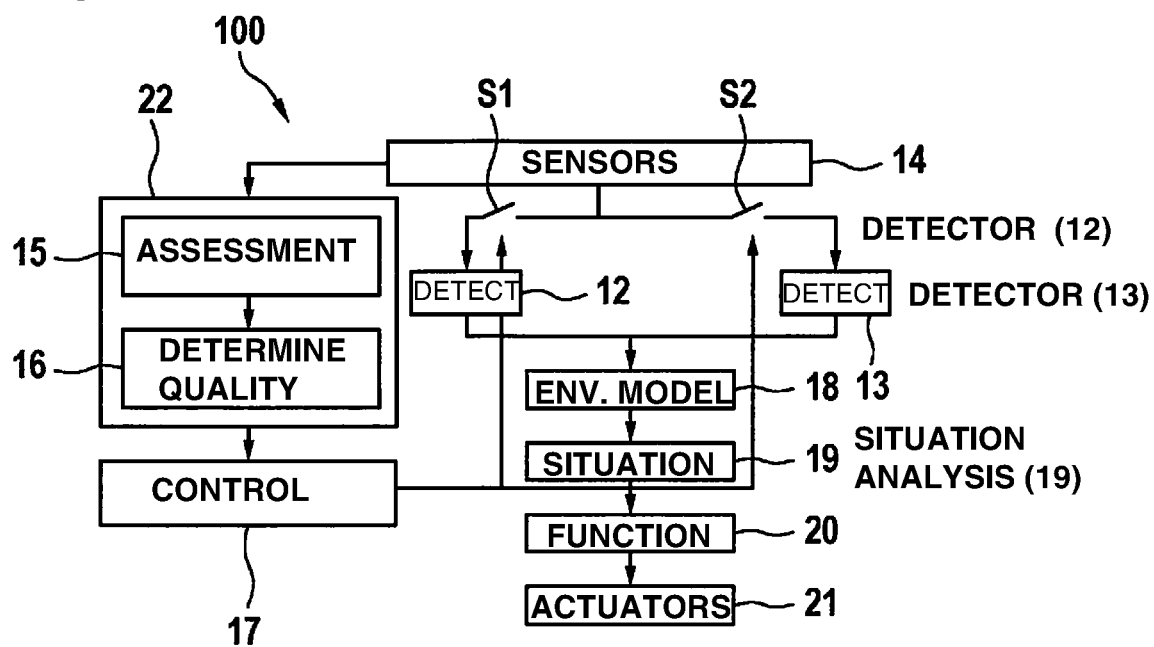
FIG. 1 shows a vehicle control system for executing the method according to the present invention, together with individual components.

FIG. 1 shows a vehicle control system 100 with a detailed illustration of individual components. As an essential component for processing the detector algorithms, vehicle control system includes a relevance assessment 22, which carries out two essential steps of the present method. To begin with, the sensor system 14 uses sensors to provide an assessment 15 of the environmental influences, i.e. the weather and the illumination conditions, for example, takes place. Assessment 15 is followed by a quality determination 16 for the purpose of determining the quality of different landmark detectors. Finally, relevance assessment 22 supplies to a control module 17 for the detector switchover a decision as to which detectors are to be used for detecting allocated landmark types.

Shown by way of example are two detectors 12 and 13, and a switch 51 for activating detector 12 is shown, switch S2 being used for activating detector 13. Switches 51 and S2 are able to be actuated by control module 17.

If either detector 12 or detector 13 or both detectors 12 and 13 is/are activated, then an environment model 18 is able to be ascertained, so that a function 20 may ultimately be provided after a situation analysis 19, by which an action for controlling the vehicle is output with the aid of an actuator system 21.

Figure 2:
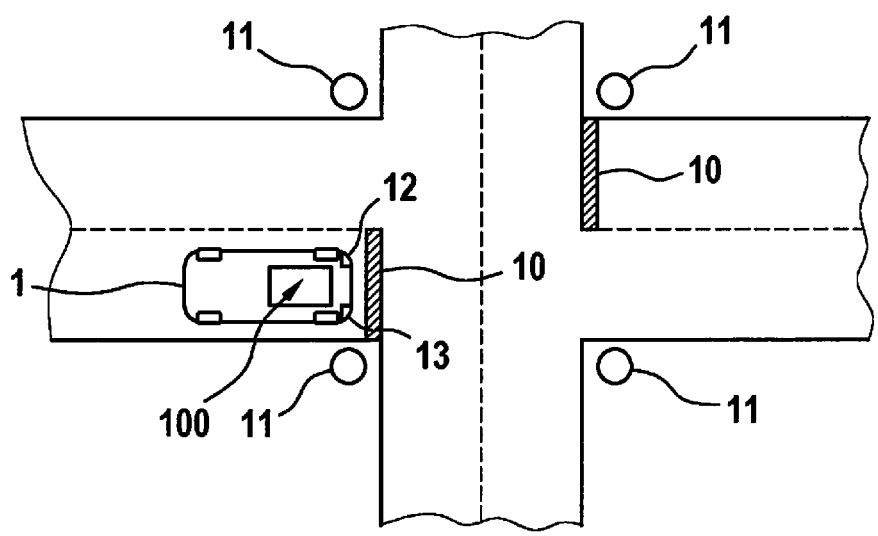
FIG. 2 shows an example of a detection scenario for determining the pose of a vehicle on the basis of different landmark types.

FIG. 2 shows a localization scenario of a vehicle 1, and different landmark types 10 and 11 are illustrated by way of example. Landmark types 10 are formed by a road marking, and landmark types 11 are formed by traffic light systems, for example, or they may be simple traffic signs or the like. Via illustrated detectors 12 and 13, landmark types 10 or 11 are detected with the aid of vehicle control system 100, and a decision is made as a function of environmental influences such as the weather or the illumination to the effect that only a detector 12 or a detector 13 senses a kind of landmark type 10 or 11 in order to carry out a localization of the vehicle in the corresponding situation. The detection of the environmental influences takes place via environment sensors of the sensor system 14, which are able to be represented by a light sensor, a rain sensor, congestion reports, the driven speed and the like.

The present invention is not restricted in its embodiment to the preferred exemplary embodiment indicated in the previous text. Instead, a number of variants is conceivable, which utilize the illustrated approach also in the case of embodiments that are basically of a different type.

What is claimed is:

1. A method for determining a pose of a vehicle, having a vehicle control system, that is driving in an at least partially automated manner, using different landmark types, the method comprising:
performing a relevance assessment, including an assessment of environmental influences;
determining a quality of the different landmark types;
supplying the relevance assessment to a control module, for a detector switchover via switches, a decision as to which detectors are to be used for detecting allocated ones of the different landmark types;
processing, via a vehicle control system, landmark data of the detected landmark types with at least two detection algorithms to determine the pose of the vehicle;
selecting at least one of the detection algorithms; and
using the selected detection algorithm for processing the landmark data of certain landmark types as a function of environmental influences;
wherein if at least one of the detectors is activated, then an environment model is ascertained, so that a function is provided after a situation analysis, by which an action for controlling the vehicle is output with an actuator system,
wherein sensable environmental influences on the selection of the landmark types are incorporated for a corresponding selection of allocated detection algorithms, so that only a detection algorithm that is required for controlling the vehicle is processed in the vehicle control system, and
wherein landmark types that are detectable with an insufficient quality under existing environmental influences are not considered.

2. The method as recited in claim 1, wherein the environmental influences include at least one of weather, traffic, visibility, a light condition, and wetness.

3. The method as recited in claim 1, further comprising:
detecting the environmental influences with the aid of environmental sensors of the vehicle; and
transmitting the environmental influences to the vehicle control system.

4. The method as recited in claim 1, wherein:
each kind of landmark type is allocated a dedicated detection algorithm, one of the detection algorithms, which is of a number of detection algorithms supplying a greatest information content as a function of the environmental influences, is activated by the vehicle control system.

5. The method as recited in claim 1, further comprising:
autonomously training the vehicle control system using landmark types as a function of the environmental influences.

6. The method as recited in claim 1, wherein the selecting of the detection algorithm for processing the landmark data of certain landmark types is carried out as a function of a localization scenario.

7. The method as recited in claim 1, wherein, while determining the pose of the vehicle, the vehicle control system at least one of: (i) switches between different detection algorithms, and (ii) one of activates and deactivates different detection algorithms.

8. A vehicle control system for determining a pose of a vehicle that is driving in an at least partially automated manner, using different landmark types, comprising:
a vehicle control device configured to perform the following:
performing a relevance assessment, including an assessment of environmental influences;
determining a quality of the different landmark types;
supplying the relevance assessment to a control module, for a detector switchover via switches, a decision as to which detectors are to be used for detecting allocated ones of the different landmark types;
wherein the vehicle control device is configured to process landmark data of the detected landmark types with at least one detector algorithm to determine the pose of the vehicle, and configured to perform the following:
selecting at least one of the detection algorithms; and
using the selected detection algorithm for processing the landmark data of certain landmark types as a function of environmental influences;
wherein if at least one of the detectors is activated, then an environment model is ascertained, so that a function is provided after a situation analysis, by which an action for controlling the vehicle is output with an actuator system,
wherein sensable environmental influences on the selection of the landmark types are incorporated for a corresponding selection of allocated detection algorithms, so that only a detection algorithm that is required for controlling the vehicle is processed in the vehicle control system, and
wherein landmark types that are detectable with an insufficient quality under existing environmental influences are not considered.

\* \* \* \* \*